(12) United States Patent
Tamilarasan et al.

(10) Patent No.: US 11,520,503 B2
(45) Date of Patent: Dec. 6, 2022

(54) METHOD AND SYSTEM FOR EFFICIENT ALLOCATION OF STORAGE

(71) Applicant: EMC IP Holding Company LLC, Hopkinton, MA (US)

(72) Inventors: Ashok Tamilarasan, Shrewsbury, MA (US); Vamsi Vankamamidi, Hopkinton, MA (US); Philippe Armangau, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 288 days.

(21) Appl. No.: 16/944,316

(22) Filed: Jul. 31, 2020

(65) Prior Publication Data

US 2022/0035542 A1 Feb. 3, 2022

(51) Int. Cl.
*G06F 3/00* (2006.01)
*G06F 3/06* (2006.01)

(52) U.S. Cl.
CPC .......... *G06F 3/0631* (2013.01); *G06F 3/0604* (2013.01); *G06F 3/0689* (2013.01)

(58) Field of Classification Search
CPC ..... G06F 3/0631; G06F 3/0604; G06F 3/0689
See application file for complete search history.

(56) References Cited

U.S. PATENT DOCUMENTS

| | | | |
|---|---|---|---|
| 6,249,852 B1* | 6/2001 | Benayon | G06F 12/023 711/170 |
| 2008/0114951 A1* | 5/2008 | Lee | G06F 11/1469 711/E12.069 |
| 2011/0106950 A1* | 5/2011 | Schlack | H04L 47/783 709/226 |

* cited by examiner

*Primary Examiner* — Craig S Goldschmidt
(74) *Attorney, Agent, or Firm* — Krishnendu Gupta; Deepika Bhayana; Derek Lam

(57) ABSTRACT

A method is used for efficient storage allocation in a storage system. An infrastructure manager receives a request for storage from a first storage operating entity. The infrastructure manager identifies, from entries in a pagebin, a pagelist with sufficient available storage to satisfy the request. The infrastructure manager locks the pagebin while assigning the identified pagelist to the first storage operating entity. Upon a commitment of the identified pagelist by the first storage operating entity, the infrastructure manager unlocks the pagebin and identifies, from the entries in the pagebin, a second pagelist with sufficient available storage to satisfy a request from a second storage operating entity.

10 Claims, 6 Drawing Sheets

```
class PageBin : public MapperOnDiskHeader
{
public:
    sbldp_t     mPageListAddr[PAGE_BIN_PAGE_LIST_COUNT];   // Pointers to page list
    uint16_t    mPageListCount;                            // Number of page list
    uint16_t    mFreePagesInPageList[PAGE_BIN_PAGE_LIST_COUNT]; // Number of pages in each of the page list. Saving the counts here for
easier processing
    sbldp_t     mInUsePageListAddr[MAPPER_FLUSH_COUNT];    // Save the page list that are currently provided to the client for tracking purposes
    uint16_t    mInUsePageListCount;  // Number of page list that are currently provided to the client
    uint64_t    mNextPageBinPageAddr;                      // Pointer to the next pageBin page in the queue
    uint8_t     mReserved[1626];
    uint8_t     mGenChecksum[16];                          // Space reserved for checksum
```

FIG. 4

```
class PageBinPageList : public MapperOnDiskHeader
{
public:
    sbldp_t   mPageAddr[MAX_PAGES_PER_PAGE_LIST];   // Pointers to actual pages for the client
    uint16_t  mPageCount;                            // Number of pages available in this page
    uint8_t   mReserved[470];
    uint8_t   mGenChecksum[16];                      // Space reserved for checksum
```

FIG. 5

METHOD AND SYSTEM FOR EFFICIENT ALLOCATION OF STORAGE

BACKGROUND

Technical Field

This application relates to efficiently allocating storage in a storage system to entities in an efficient manner.

Description of Related Art

Computer systems may include different resources used by one or more host processors. Resources and host processors in a computer system may be interconnected by one or more communication connections. These resources may include, for example, data storage devices. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Such a data storage system typically includes processing circuitry and a set of disk drives (disk drives are also referred to herein as simply "disks" or "drives"). In general, the processing circuitry performs load and store operations on the set of disk drives on behalf of the host devices. In certain data storage systems, the disk drives of the data storage system are distributed among one or more separate disk drive enclosures (disk drive enclosures are also referred to herein as "disk arrays" or "storage arrays") and processing circuitry serves as a front-end to the disk drive enclosures. The disk drive enclosures may be distributed among one or more appliances. The processing circuitry presents the disk drive enclosures to the host device as a single, logical storage location and allows the host device to access the disk drives such that the individual disk drives and disk drive enclosures are transparent to the host device.

Disk arrays are typically used to provide storage space for one or more computer file systems, databases, applications, and the like. For this and other reasons, it is common for disk arrays to be structured into logical partitions of storage space, called logical units (also referred to herein as LUs or LUNs). For example, at LUN creation time, storage system may allocate storage space of various storage devices in a disk array to be presented as a logical volume for use by an external host device. This allows a disk array to appear as a collection of separate file systems, network drives, and/or volumes.

It is noted that the terms "storage device(s)", "drive(s)", and "disk(s)" are employed herein interchangeably, even though it is well known that not all physical storage devices or drives include rotating disks.

SUMMARY OF THE INVENTION

One aspect of the current technique is a method for efficient allocation of storage in a storage system. The method includes receiving, by an infrastructure manager, a request for storage from a first storage operating entity. The method also includes identifying, by the infrastructure manager, from entries in a pagebin, a pagelist with sufficient available storage to satisfy the request. The method further includes locking, by the infrastructure manager, the pagebin while assigning the identified pagelist to the first storage operating entity. The method includes, upon a commitment of the identified pagelist by the first storage operating entity, unlocking the pagebin, and identifying, from the entries in the pagebin, a second pagelist with sufficient available storage to satisfy a request from a second storage operating entity.

The first storage operating entity may remove pages from its assigned pagelist to satisfy the request for storage. The first storage operating entity may return its assigned pagelist to the infrastructure manager. The first storage operating entity may return pages to its assigned pagelist and return its assigned pagelist to the infrastructure manager.

The infrastructure manager may receive a request from the first storage operating entity to replenish pages on its assigned pagelist, and transfer pages from another pagelist in the pagebin to the assigned pagelist.

Another aspect of the current technique is a system, with a processor, for efficient allocation of storage in a storage system. The processor is configured receive a request for storage from a first storage operating entity; identify, from entries in a pagebin, a pagelist with sufficient available storage to satisfy the request; lock the pagebin while assigning the identified pagelist to the first storage operating entity; and upon a commitment of the identified pagelist by the first storage operating entity, (1) unlock the pagebin and (2) identify from the entries in the pagebin, a second pagelist with sufficient available storage to satisfy a request from a second storage operating entity. The processor may be configured to perform any other processes in conformance with the aspect of the current techniques described above.

BRIEF DESCRIPTION OF THE DRAWINGS

Features and advantages of the present technique will become more apparent from the following detailed description of exemplary embodiments thereof taken in conjunction with the accompanying drawings in which:

FIG. 4 depicts an exemplary data structure for the first page of the pagebin of FIG. 3;

FIG. 5 depicts an exemplary data structure for the pages consumed by a entity, as used in the computer system of FIG. 1.

DETAILED DESCRIPTION OF EMBODIMENT(S)

Described below is a technique for efficiently allocating storage in a storage system, which technique may be used to provide, among other things, receiving, by an infrastructure manager, a request for storage from a first storage operating entity; identifying, by the infrastructure manager, from entries in a pagebin, a pagelist with sufficient available storage to satisfy the request; locking, by the infrastructure manager, the pagebin while assigning the identified pagelist to the first storage operating entity; and upon a commitment of the identified pagelist by the first storage operating entity, unlocking the pagebin, and identifying, from the entries in the pagebin, a second pagelist with sufficient available storage to satisfy a request from a second storage operating entity.

One technique for allocating storage in a storage system relies on a queue of pages in storage. Pages that are available for use are organized in a doubly linked list. For a storage operating entity to obtain additional pages of storage, the storage operating entity must first lock the queue. Then, the storage operating entity traverses the queue to identify the first available page. After removing this page from the pool of available pages, the storage operating entity updates the head of the queue to point to the next page in the linked list. These steps are repeated until the storage operating entity obtains all of the pages that it requires.

Since the queue remains locked while one storage operating entity is obtaining storage, no other storage operating entity can obtain storage until the first storage operating entity has finished securing its pages. Furthermore, each manipulation of the queue, particularly in updating the pointers in the linked list, incurs access to disk, further increasing the latency of the storage allocation.

In at least some implementations in accordance with the techniques as described herein, the use of efficient storage allocation techniques in storage systems can provide one or more of the following advantages: parallel processing of requests for storage; decreased latency for storage allocation; and reduced needs to request additional allocations of storage.

Figure 1:
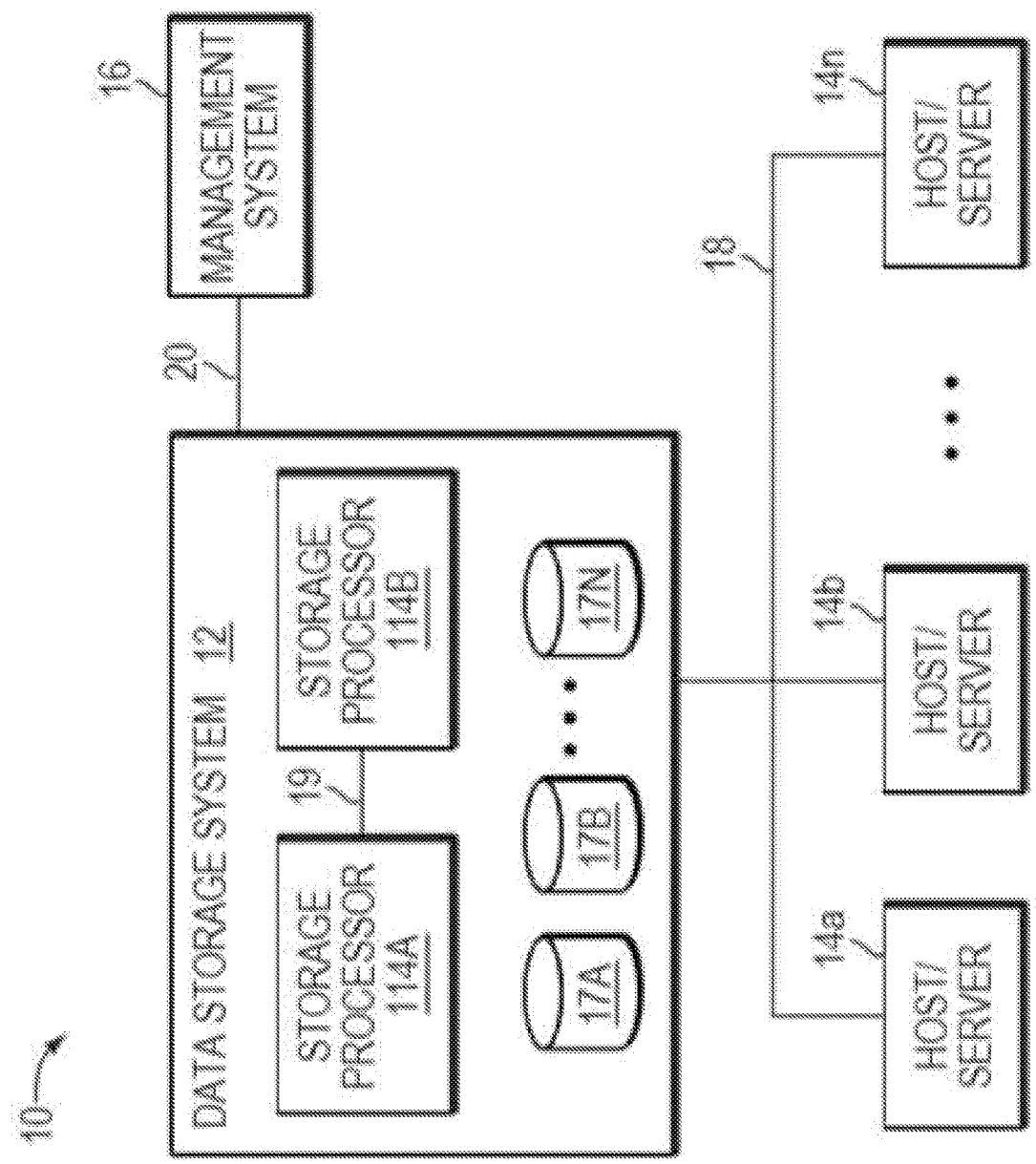
FIG. 1 depicts an example embodiment of a computer system that may be used in connection with performing the techniques described herein.

FIG. 1 depicts an example embodiment of a computer system 10 that may be used in connection with performing the techniques described herein. The system 10 includes one or more data storage systems 12 connected to server or hosts 14a-14n through communication medium 18. The system 10 also includes a management system 16 connected to one or more data storage systems 12 through communication medium 20. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the hosts 14a-14n may access and communicate with the data storage systems 12, and may also communicate with other components (not shown) that may be included in the system 10. In one embodiment, the communication medium 20 may be a LAN connection and the communication medium 18 may be an iSCSI, Fibre Channel, Serial Attached SCSI, or Fibre Channel over Ethernet connection.

Each of the hosts 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the hosts 14a-14n and management system 16 may be any one of a variety of proprietary or commercially available single or multi-processor system, or other type of commercially available processor able to support traffic in accordance with any embodiments described herein.

It should be noted that the particular examples of the hardware and software that may be included in the data storage systems 12 are described herein in more detail, and may vary with each particular embodiment. Each of the hosts 14a-14n, the management system 16 and data storage systems 12 may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts 14a-14n, management system 16, and data storage systems 12 may be connected to their respective communication medium 18, 20 may pass through other communication devices, such as switching equipment that may exist such as a phone line, a repeater, a multiplexer or even a satellite. In one embodiment, the hosts 14a-14n may communicate with the data storage systems 12 over an iSCSI or a Fibre Channel connection and the management system 16 may communicate with the data storage systems 12 over a separate network connection using TCP/IP. It should be noted that although FIG. 1 illustrates communications between the hosts 14a-14n and data storage systems 12 being over a first communication medium 18, and communications between the management system 16 and the data storage systems 12 being over a second different communication medium 20, other embodiments may use the same connection. The particular type and number of communication mediums and/or connections may vary in accordance with particulars of each embodiment.

Each of the hosts 14a-14n may perform different types of data operations in accordance with different types of tasks. In the embodiment of FIG. 1, any one of the hosts 14a-14n may issue a data request to the data storage systems 12 to perform a data operation. For example, an application executing on one of the hosts 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. The management system 16 may, for example, display information about a current storage volume configuration, provision resources for a data storage system 12, and the like.

Each of the data storage systems 12 may include one or more data storage devices 17a-17n. Unless noted otherwise, data storage devices 17a-17n may be used interchangeably herein to refer to hard disk drive, solid state drives, and/or other known storage devices. One or more data storage devices 17a-17n may be manufactured by one or more different vendors. Each of the data storage systems included in 12 may be inter-connected (not shown). Additionally, the data storage systems 12 may also be connected to the hosts 14a-14n through any one or more communication connections that may vary with each particular embodiment. The type of communication connection used may vary with certain system parameters and requirements, such as those related to bandwidth and throughput required in accordance with a rate of I/O requests as may be issued by the hosts 14a-14n, for example, to the data storage systems 12. It should be noted that each of the data storage systems 12 may operate stand-alone, or may also be included as part of a storage area network (SAN) that includes, for example, other components such as other data storage systems 12. The particular data storage systems 12 and examples as described herein for purposes of illustration should not be construed as a limitation. Other types of commercially available data storage systems 12, as well as processors and hardware controlling access to these particular devices, may also be included in an embodiment.

In such an embodiment in which element 12 of FIG. 1 is implemented using one or more data storage systems 12, each of the data storage systems 12 may include code thereon for performing the techniques as described herein.

Servers or hosts, such as 14a-14n, provide data and access control information through channels on the communication medium 18 to the data storage systems 12, and the data storage systems 12 may also provide data to the host systems 14a-14n also through the channels 18. The hosts 14a-14n may not address the disk drives of the data storage systems 12 directly, but rather access to data may be provided to one or more hosts 14a-14n from what the hosts 14a-14n view as a plurality of logical devices or logical volumes (LVs). The LVs may or may not correspond to the actual disk drives. For example, one or more LVs may reside on a single physical disk drive. Data in a single data storage system 12 may be accessed by multiple hosts 14a-14n allowing the hosts 14a-14n to share the data residing therein. An LV or LUN (logical unit number) may be used to refer to the foregoing logically defined devices or volumes.

The data storage system 12 may be a single unitary data storage system, such as single data storage array, including two storage processors 114A, 114B or computer processing units. Techniques herein may be more generally use in connection with any one or more data storage system 12 each including a different number of storage processors 114 than as illustrated herein. The data storage system 12 may include a data storage array 116, including a plurality of data storage devices 17a-17n and two storage processors 114A, 114B. The storage processors 114A, 114B may include a central processing unit (CPU) and memory and ports (not shown) for communicating with one or more hosts 14a-14n. The storage processors 114A, 114B may be communicatively coupled via a communication medium such as storage processor bus 19. The storage processors 114A, 114B may be included in the data storage system 12 for processing requests and commands. In connection with performing techniques herein, an embodiment of the data storage system 12 may include multiple storage processors 114 including more than two storage processors as described. Additionally, the two storage processors 114A, 114B may be used in connection with failover processing when communicating with the management system 16. Client software on the management system 16 may be used in connection with performing data storage system management by issuing commands to the data storage system 12 and/or receiving responses from the data storage system 12 over connection 20. In one embodiment, the management system 16 may be a laptop or desktop computer system.

The particular data storage system 12 as described in this embodiment, or a particular device thereof, such as a disk, should not be construed as a limitation. Other types of commercially available data storage systems 12, as well as processors and hardware controlling access to these particular devices, may also be included in an embodiment.

In some arrangements, the data storage system 12 provides block-based storage by storing the data in blocks of logical storage units (LUNs) or volumes and addressing the blocks using logical block addresses (LBAs). In other arrangements, the data storage system 12 provides file-based storage by storing data as files of a file system and locating file data using inode structures. In yet other arrangements, the data storage system 12 stores LUNs and file systems, stores file systems within LUNs, and so on.

The two storage processors 114A, 114B (also referred to herein as "SP") may control the operation of the data storage system 12. The processors may be configured to process requests as may be received from the hosts 14a-14n, other data storage systems 12, management system 16, and other components connected thereto. Each of the storage processors 114A, 114B may process received requests and operate independently and concurrently with respect to the other processor. With respect to data storage management requests, operations, and the like, as may be received from a client, such as the management system 16 of FIG. 1 in connection with the techniques herein, the client may interact with a designated one of the two storage processors 114A, 114B. Upon the occurrence of failure of one the storage processors 114A, 114B, the other remaining storage processors 114A, 114B may handle all processing typically performed by both storage processors 114A.

Figure 2:
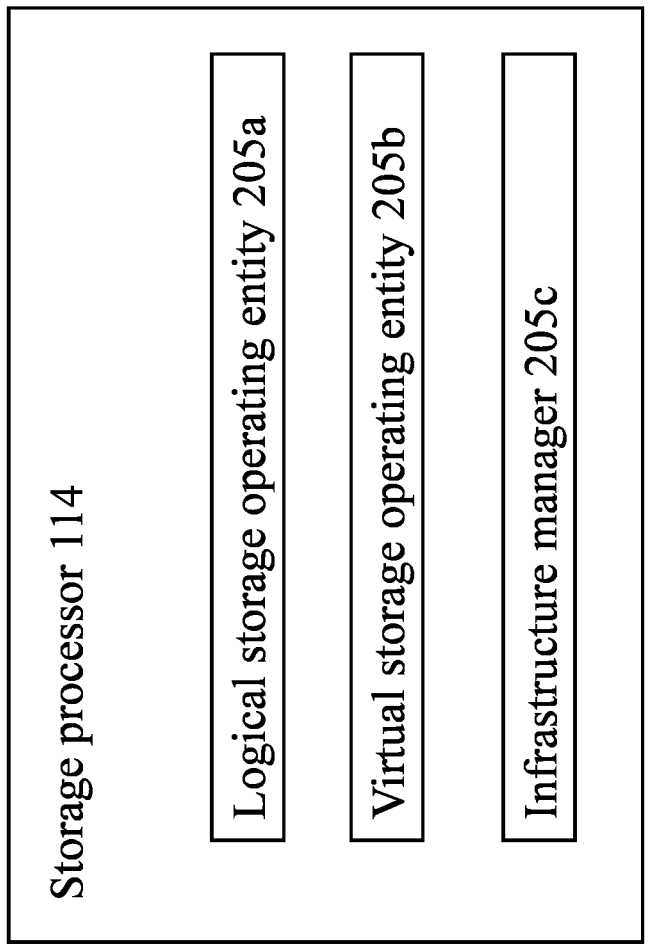
FIG. 2 depicts a schematic diagram of entities that can be executed by the storage processors in the computer system of FIG. 1.

FIG. 2 depicts a schematic diagram of exemplary storage operating entities 205a, 205b, 205c (collectively, "205") that can be executed by a storage processor 114 in the computer system 10 of FIG. 1. The storage operating entities 205 can control the operation of the data storage system 12, and any given entity can be logical or virtual. The infrastructure manager 205c can manage the overall infrastructure of the data storage system 12. The storage processor 114 may execute any number of storage operating entities 205 of any type.

Figure 3:
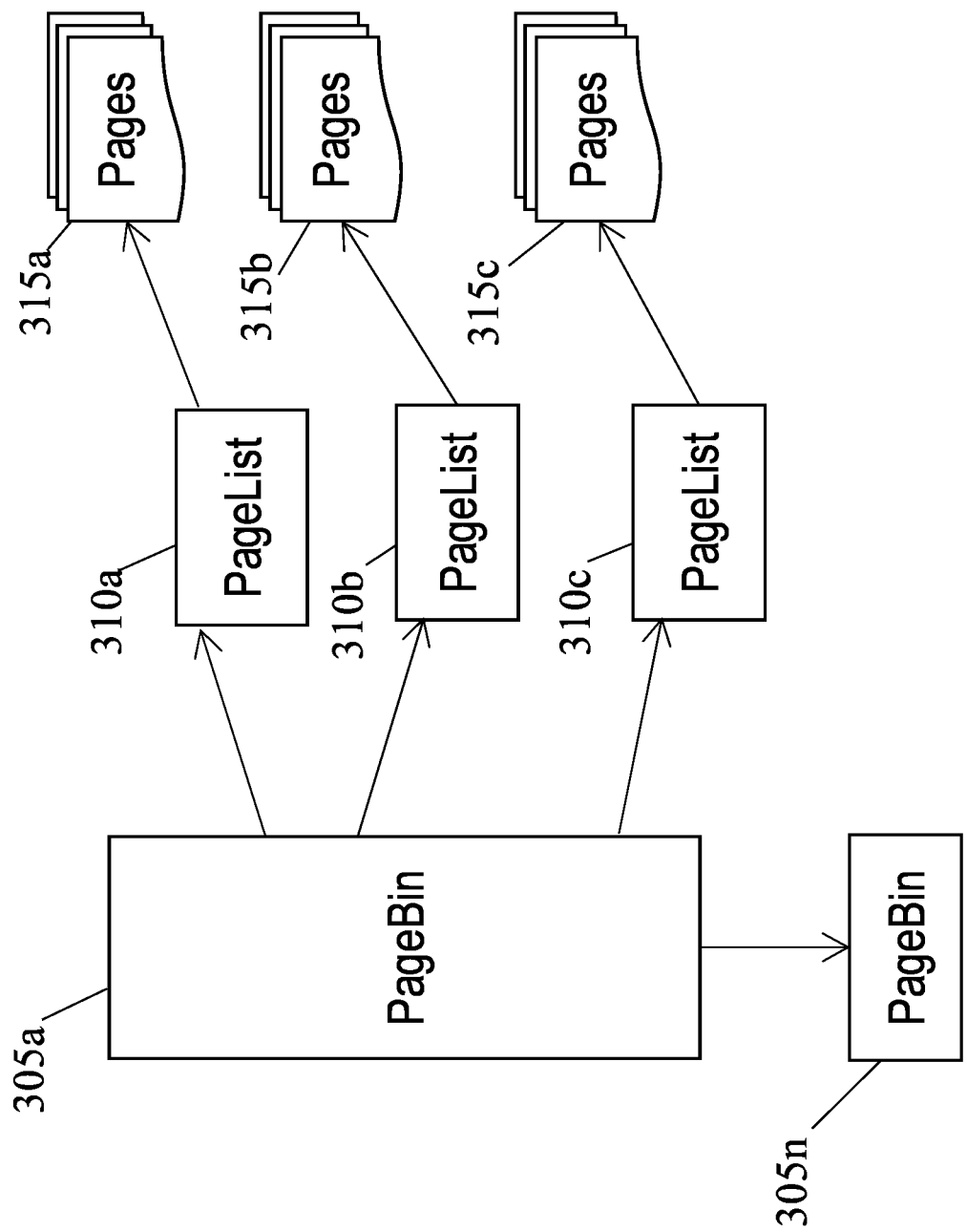
FIG. 3 depicts a schematic diagram of data structures used to enable efficient allocation of storage, as deployed in the computer system of FIG. 1.

FIG. 3 depicts a schematic diagram of data structures used to enable efficient allocation of storage to entities, as deployed in the computer system 10 of FIG. 1. The data structures are arranged in two levels, the pagebin 305 and the pagelists 310. The pagebin 305 includes an array of pointers, which may span multiple pages 306a, . . . , 306b (collectively "306"). Each pointer points to a pagelist 310. Each pagelist 310 corresponds to a unique set of pages 315, and tracks which pages 315 are being used and which pages 315 are available. In some embodiments, a pagelist 310 includes the addresses for its pages 315. In one example, a page 306a from the pagebin 305 includes pointers to five hundred twelve (512) pagelists 310, and each pagelist 310 includes addresses for five hundred twelve (512) pages 315. As a result, one page 306a of the pagebin 305 accounts for 512×512=256K pages.

When additional storage is provisioned for the data storage system 12, the new pages 315 may be appended to an existing pagelist 310. If all pagelists 310 are full, the infrastructure manager 205c creates a new pagelist 310, adds the addresses for the new pages 315, and appends this new pagelist 310 to the last page 306 of the pagebin 305. In some embodiments, the new pagelist 310 is added to a new page 306, which is then daisy chained to the last page 306 of the pagebin 305. In this manner, all of the pages 306 of the pagebin 305 may be daisy chained together, and the pagebin 305 may be expanded or contracted according to the needs of the data storage system 12.

In various embodiments, the first page 306a of the pagebin 305 may be stored as boot data on a data storage device 17. An exemplary data structure for the first page 306a of the pagebin is shown in FIG. 4. All subsequent pages 306b-306n, as well as the pagelists 310 and the pages 315 themselves may be stored as metadata.

In some embodiments, a storage operating entity 205 issues a request to the infrastructure manager 205c specifying a number of pages 315 of storage. Based on the entries in the pagebin 305, the infrastructure manager 205c identifies a pagelist 310 that includes the needed number of available pages 315. The infrastructure manager 205c marks the identified pagelist 310 as unavailable, places a lock on the pagebin 305, and assigns the pagelist 310 to the storage operating entity 205. After the storage operating entity 205 commits the assignment of the pagelist 310, the infrastructure manager 205c removes the lock and processes subsequent requests from other entities 205 for pages 315. As a result, the pagebin 305 remains locked solely when the infrastructure manager 205c awaits commitments from entities 205 of their assigned pagelists 310.

When a storage operating entity 205 receives a pagelist 310, the storage operating entity 205 may use any of the available pages 315 therein. An exemplary data structure regarding the number of available pages 315 on a pagelist 310 is shown in FIG. 5. The storage operating entity 205 remove pages 315 from the pagelist 310 by, for example, marking them as unavailable. In some embodiments, the storage operating entity 205 retains the pagelist 310. Thus, whenever the storage operating entity 205 requires additional storage, the storage operating entity 205 simply removes additional pages 315 from the pagelist 310; there is no need to submit storage requests to the infrastructure manager 205c until the pagelist 310 has been exhausted. In some embodiments, when the storage operating entity 205 has emptied the pagelist 310, the storage operating entity 205 may send a request to the infrastructure manager 205c to replenish the pagelist 310. In response, the infrastructure manager 205c may transfer pages 315 on a different pagelist 310 of the pagebin 305 to the pagelist 310 assigned to the storage operating entity 205.

In other embodiments, the storage operating entity 205 returns the pagelist 310 to the pagebin 305 after the storage operating entity 205 has removed the pages 315 that it needs. For example, the storage operating entity 205 may send to the infrastructure manager 205c a message indicating that the storage operating entity 205 has completed obtaining the pages 315 that it requires. Infrastructure manager 205c updates the pagebin 305 to indicate that the pagelist 310 is now available for other hosts 14. As the infrastructure manager 205c receives additional requests for storage, the infrastructure manager 205c may assign this same pagelist 310 to another storage operating entity 205, which may then remove any of the remaining pages 315.

Advantageously, this two-level arrangement reduces the latency for storage requests. Because the pagebin 305 remains locked only while entities 205 are committing the assignments of their pagelists 310, the infrastructure manager 205c can service requests at a faster rate. After a storage operating entity 205 commits the assignment of a pagelist 310, the infrastructure manager 205c can continue responding to other entities 205 in parallel with the storage operating entity's 205 end fulfillment of its storage needs. Moreover, as each pagelist 310 spans a unique set of pages 315, none of the entities 205 that have been assigned pagelists 310 will collide with one another.

In some embodiments, a storage operating entity's 205 storage needs may decrease. For example, files or other data may be deleted such that the storage the data previously occupied is no longer needed. If the storage operating entity 205 has retained a pagelist 310, the storage operating entity 205 may add pages 315 and return the pagelist 310 to the pagebin 305. In other embodiments, the storage operating entity 205 may request a pagelist 310 from the infrastructure manager 205c for this very purpose. The infrastructure manager 205c may select any pagelist 310 with enough empty pages 315 to accommodate the storage operating entity's 205 pages 315 for release. In some embodiments, the infrastructure manager 205c selects the pagelist 310 whose number of removed pages 315 is closest to the storage operating entity's 205 number of pages 315 for release, such that the pagelist 310 would be repopulated with the maximum number of pages 315 for the next storage operating entity 205 requesting storage.

Figure 6:
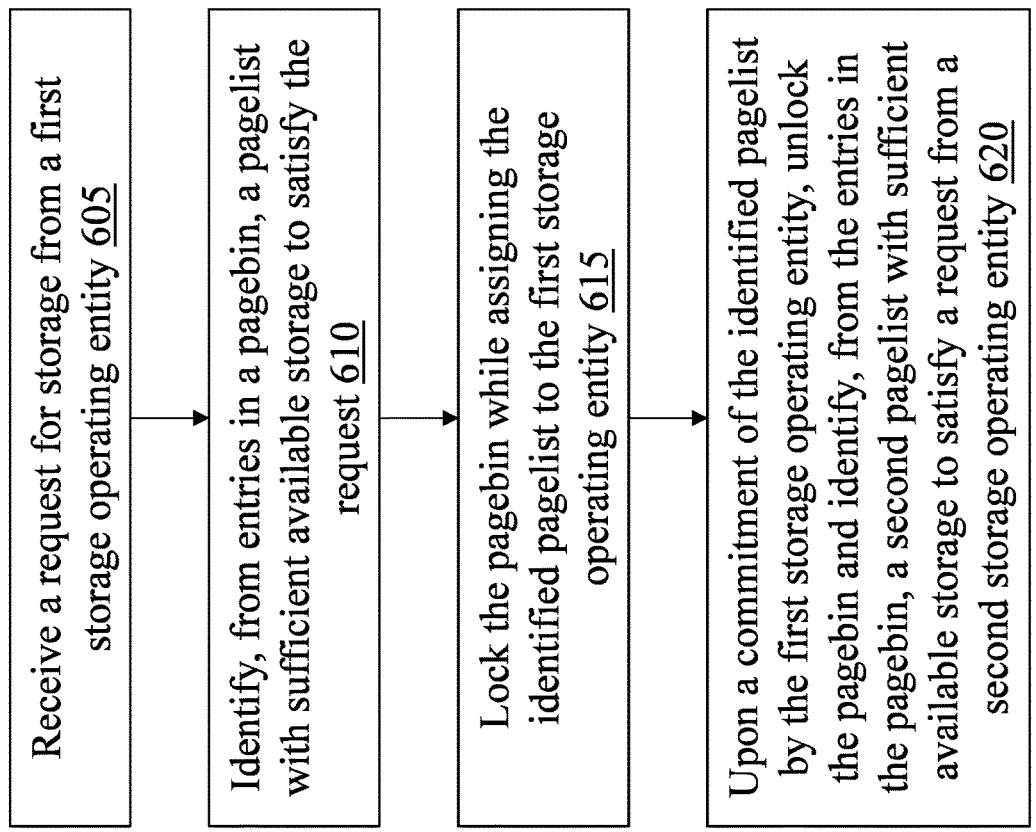
FIG. 6 is an exemplary flow diagram of a method for efficiently allocating storage in a storage system.

FIG. 6 is an exemplary flow diagram of a method 600 for efficiently allocating storage in a storage system. The method 600 receives a request for storage from a first storage operating entity (step 605). The method 600 identifies, from entries in a pagebin, a pagelist with sufficient available storage to satisfy the request (step 610). The method locks the pagebin while assigning the identified pagelist to the first storage operating entity (step 615). Upon a commitment of the identified pagelist by the first storage operating entity, the method unlocks the pagebin and identifies, from the entries in the pagebin, a second pagelist with sufficient available storage to satisfy a request from a second storage operating entity (step 620).

It should again be emphasized that the implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for efficiently allocating storage in a storage system, the method comprising:
receiving, by an infrastructure manager, a request for storage from a first storage operating entity;
identifying, by the infrastructure manager, from entries in a pagebin, a pagelist with sufficient available storage to satisfy the request;
locking, by the infrastructure manager, the pagebin while assigning the identified pagelist to the first storage operating entity;
upon a commitment of the identified pagelist by the first storage operating entity, (1) unlocking, by the infrastructure manager, the pagebin, and (2) identifying, by the infrastructure manager, from the entries in the pagebin, a second pagelist with sufficient available storage to satisfy a request from a second storage operating entity.

2. The method of claim 1, further comprising:
removing, by the first storage operating entity, pages from its assigned pagelist to satisfy the request for storage.

3. The method of claim 2, further comprising:
returning, by the first storage operating entity, its assigned pagelist to the infrastructure manager.

4. The method of claim 2, further comprising:
returning, by the first storage operating entity, pages to its assigned pagelist; and
returning, by the first storage operating entity, its assigned pagelist to the infrastructure manager.

5. The method of claim 1, further comprising:
receiving, by the infrastructure manager, a request from the first storage operating entity to replenish pages on its assigned pagelist; and
transferring, by the infrastructure manager, pages from another pagelist in the pagebin to the assigned pagelist.

6. A system for efficient storage allocation in a storage system, the system comprising a processor configured to:
receive a request for storage from a first storage operating entity;
identify, from entries in a pagebin, a pagelist with sufficient available storage to satisfy the request;
lock the pagebin while assigning the identified pagelist to the first storage operating entity;
upon a commitment of the identified pagelist by the first storage operating entity, (1) unlock the pagebin and (2) identify from the entries in the pagebin, a second pagelist with sufficient available storage to satisfy a request from a second storage operating entity.

7. The system of claim 6, wherein the processor is further configured to:
remove, by the first storage operating entity, pages from its assigned pagelist to satisfy the request for storage.

8. The system of claim 7, wherein the processor is further configured to:
return, by the first storage operating entity, its assigned pagelist to the infrastructure manager.

9. The system of claim 7, wherein the processor is further configured to:
return, by the first storage operating entity, pages to its assigned pagelist; and
return, by the first storage operating entity, its assigned pagelist to an infrastructure manager.

10. The system of claim 6, wherein the processor is further configured to:
receive a request from the first storage operating entity to replenish pages on its assigned pagelist; and
transfer pages from another pagelist in the pagebin to the assigned pagelist.

* * * * *